United States Patent
Drost (10) Patent No.: US 7,429,015 B2
(45) Date of Patent: Sep. 30, 2008

(54) ACOUSTIC ABSORPTION BLANKET MOUNTING SYSTEM FOR AN AIRCRAFT CABIN

(75) Inventor: Stuart K. Drost, Shelton, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 324 days.

(21) Appl. No.: 11/017,564

(22) Filed: Dec. 20, 2004

(65) Prior Publication Data

US 2006/0145005 A1    Jul. 6, 2006

(51) Int. Cl.
*B64C 1/40* (2006.01)

(52) U.S. Cl. .............. 244/1 N; 244/117 R; 244/133

(58) Field of Classification Search .......... 244/117 R, 244/119, 133; 52/407.4, 512, 404.1–404.5, 52/506.01–513
See application file for complete search history.

(56) References Cited

U.S. PATENT DOCUMENTS

| | | | |
|---|---|---|---|
| 2,264,976 A * | 12/1941 | Heritage | 52/406.1 |
| 3,121,649 A * | 2/1964 | Oliver | 52/746.11 |
| 3,221,835 A | 12/1965 | Wenger | |
| 4,233,791 A * | 11/1980 | Kuhl et al. | 52/309.1 |
| 4,340,129 A | 7/1982 | Salyers | |
| 4,456,092 A | 6/1984 | Kubozuka et al. | |
| 4,848,514 A | 7/1989 | Snyder | |
| 4,940,112 A | 7/1990 | O'Neill | |
| 5,039,567 A | 8/1991 | Landi et al. | |
| 5,144,786 A * | 9/1992 | Pacione | 52/747.1 |
| 5,175,401 A | 12/1992 | Arcas et al. | |
| 5,300,178 A | 4/1994 | Nelson et al. | |
| 5,445,861 A | 8/1995 | Newton et al. | |
| 5,557,078 A | 9/1996 | Holwerda | |
| 5,670,758 A | 9/1997 | Borchers et al. | |
| 5,691,037 A | 11/1997 | McCutcheon et al. | |
| 5,700,527 A | 12/1997 | Fuchs et al. | |
| 5,824,974 A | 10/1998 | Campbell | |
| 6,007,026 A | 12/1999 | Shorey | |
| 6,024,190 A | 2/2000 | Ritzema | |
| 6,213,430 B1 | 4/2001 | Spandorf | |
| 6,224,020 B1 | 5/2001 | Hopkins et al. | |
| 6,231,710 B1 | 5/2001 | Herup et al. | |
| 6,260,660 B1 | 7/2001 | Yoerkie, Jr. et al. | |
| 6,648,100 B2 | 11/2003 | Ebbitt | |

* cited by examiner

*Primary Examiner*—Timothy D. Collins
(74) *Attorney, Agent, or Firm*—Carlson, Gaskey & Olds (57) ABSTRACT

An acoustic absorption blanket mounting system includes a blanket mounting strip (BMS) attached to a fastener strip mounted to an airframe member. The BMS is generally of a "><"shape to removably capture a sound proofing blanket between opposed pair of wings. At least one wing of the pair of wings includes an acoustic gasket strip sewn to the BMS base material layer. Opposed blanket hook and loop strips correspond to wing hook and loop strips such that a soundproofing blanket is retained between the wings such that the acoustic gasket strip minimizes acoustic leakage heretofore experienced in soundproofing blanket attachments.

20 Claims, 9 Drawing Sheets

ACOUSTIC ABSORPTION BLANKET MOUNTING SYSTEM FOR AN AIRCRAFT CABIN

BACKGROUND OF THE INVENTION

The present invention relates to a noise reduction treatment for an aircraft cabin, and more particularly to a soundproofing blanket mounting system which reduces aircraft interior noise levels while facilitating maintenance.

Noise develops in an aircraft cabin from several sources. The most common sources are internally or externally mounted moving components, such as a transmission, engine or rotor system. Another source of cabin noise is airflow over various aircraft fuselage components. These components generate vibrations in the aircraft that propagate through the airframe and radiate into the cabin.

Noise may be a particular problem in rotary wing aircraft cabins since the rotor and transmission systems produce a significant amount of vibration directly into the airframe structure. This problem may be more pronounces in rotary wing aircraft than in fixed wing aircraft inasmuch as the dynamic components on a rotary wing aircraft are mounted directly above the cabin.

The main noise problem in helicopter cabins is mid to high frequency gear whine noise from the main transmission. This results in cabin noise vibrations typically from about 350 Hz through 4,000 Hz. In contrast noise vibrations from the main and tail rotor sources are in the 20 Hz to 125 Hz range and are attenuated by up to 40+ dB by the response of the human ear.

Aircraft cabin interiors are generally designed to maintain aircraft interior noise below a certain level predetermined by competitive pressures in the marketplace. For example, executive transport rotary wing aircraft typically provide a design average noise level limit with the environmental control system (fans, vent air and cooling/heating system) turned off of approximately 75 dB SIL4. The SIL4 (Speech Interference Level 4) noise measurement metric is the arithmetic average of the sound pressure levels in the 500, 1000, 2000 and 4000 Hz octave bands. It rates steady noise according to interference with conversation between two people.

Various conventional acoustic absorption systems have been provided to reduce noise levels within the cabin to below desired SIL4 values. One current system is the installation of soundproofing blankets. The blankets are removably attached directly to the airframe frame members in aircraft cabin sections where much of the noise would otherwise be radiated into the cabin interior. More specifically, the soundproofing blankets are attached with hook and loop fastener strips to the frame members in an overlapped arrangement. That is, a first blanket is attached to a frame member and an adjacent blanket is attached to the first blanket. Although relatively effective, there remains acoustic leakage across the attachment intersection of the soundproofing blankets. Vibration grounding also occurs at the blanket intersections due to insufficient clearance between the airframe and interior trim panels. These grounding points and the acoustic leakage combine to result in undesirable cabin noise levels.

Figure 6:
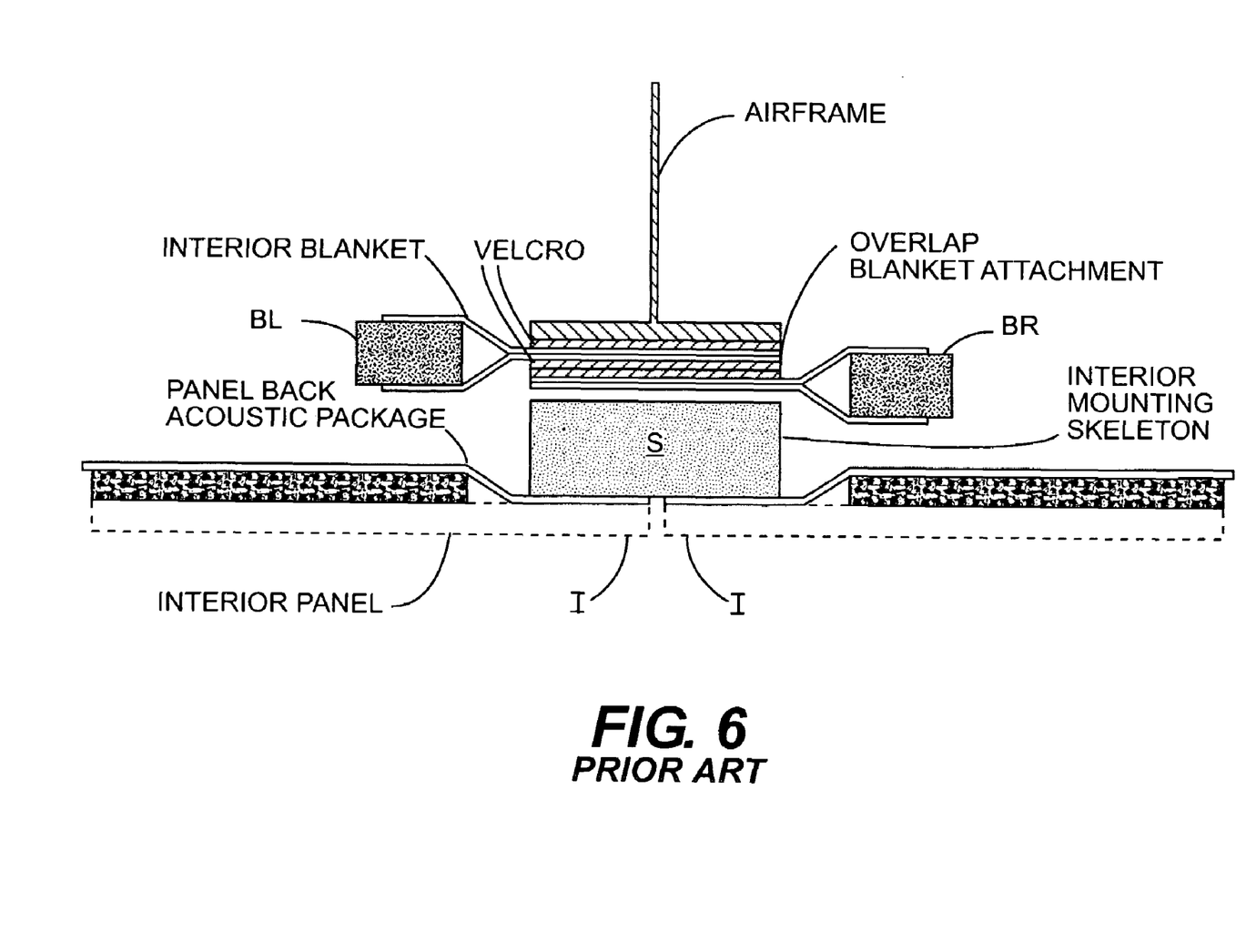
FIG. 6 is a PRIOR ART blanket attachment arrangement.

Also, because the blankets are overlapped, significant portions of the soundproofing blanket typically including adjacent portions thereof must be removed to provide access to the airframe and avionics systems behind the soundproofing blankets. For example, to remove the left side interior blanket BL, as illustrated in FIG. 6, both interior trim panels I must first be removed; the skeleton frame member S is removed; the right side interior blanket BR is then pulled back in order to access the left side blanket BL.

Accordingly, it is desirable to provide a lightweight, acoustic absorption soundproofing blanket attachment system which minimizes acoustic leakage across intersections yet provides for efficient blanket removal for maintenance access.

SUMMARY OF THE INVENTION

An acoustic absorption system according to the present invention includes a blanket mounting strip (BMS) attached to a fastener strip mounted to an airframe member. The BMS is generally of a "><" shape to removably capture a sound proofing blanket between opposed pairs of wings.

An interior skeleton structure is mounted to interior skeleton mounts to generally overlap and provide for additional retention of the BMS. The interior skeleton structure provides support and attachment for a multitude of acoustic absorption trim panels.

A first wing of the pair of wings includes a wing hook and loop strip sewn to a BMS base material layer. A second wing opposed to the first wing of the pair of wings includes a wing hook and loop strip and an acoustic gasket strip sewn to the BMS base material layer. Opposed blanket hook and loop strips correspond to the wing hook and loop strips such that the blanket is retained between the wings and the acoustic gasket strip minimizes acoustic leakage.

Each pair of wings of the BMS extend outside the edges of the adjacent interior skeleton structure member such that each opposed blanket may be removed independently without skeleton removal or disturbance of the acoustic integrity of the neighboring blanket.

The present invention therefore provides a lightweight, acoustic absorption soundproofing blanket attachment system which minimizes acoustic leakage across intersections yet provides for efficient blanket removal for maintenance access.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
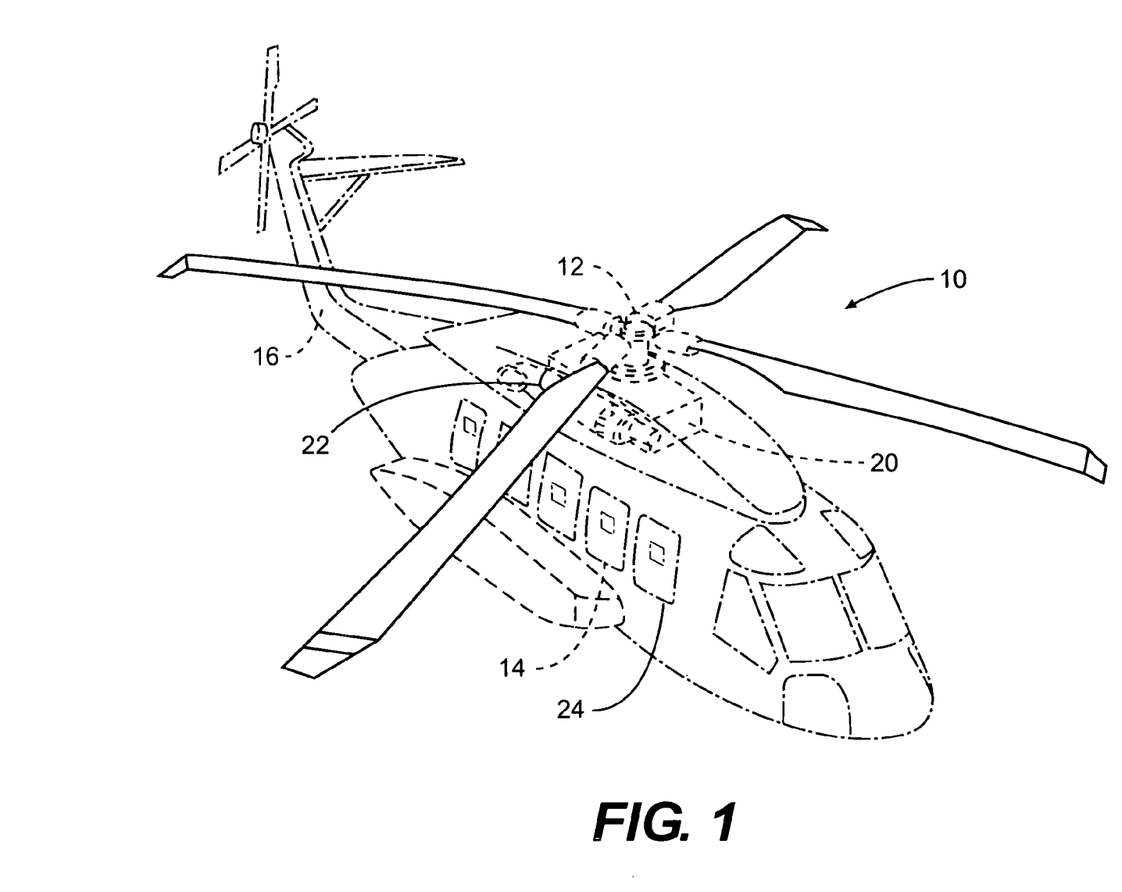
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 2A:
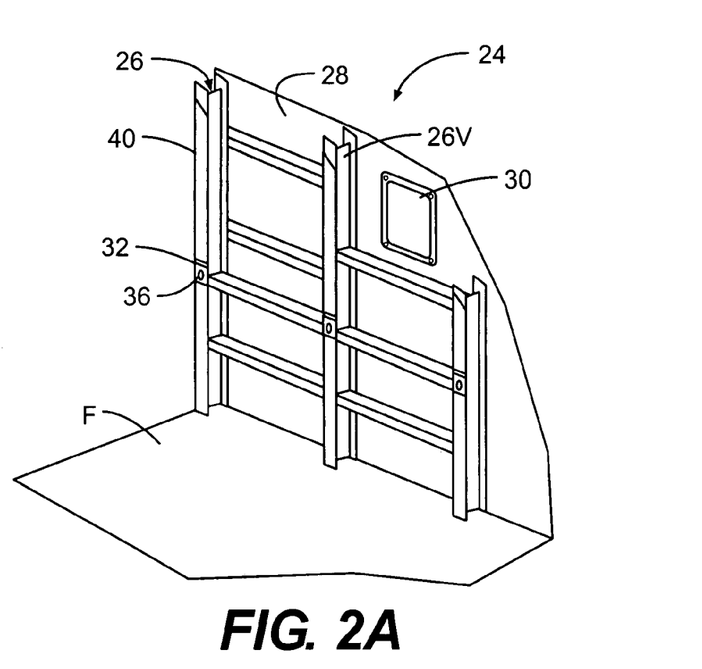
FIG. 2A is a perspective view of an airframe section.

Referring to FIG. 2A, an airframe section 24 includes a multitude of frame members 26 which support an outer skin 28. The airframe section 24 is the outer structure of the aircraft 10 and may include one or more window areas 30. The window areas 30 are typically located through the outer skin 28 between the multitude of frame members 26. The multitude of frame members 26 are typically arranged in a rectilinear pattern, however, any arrangement may be used with the present invention.

Figure 2B:
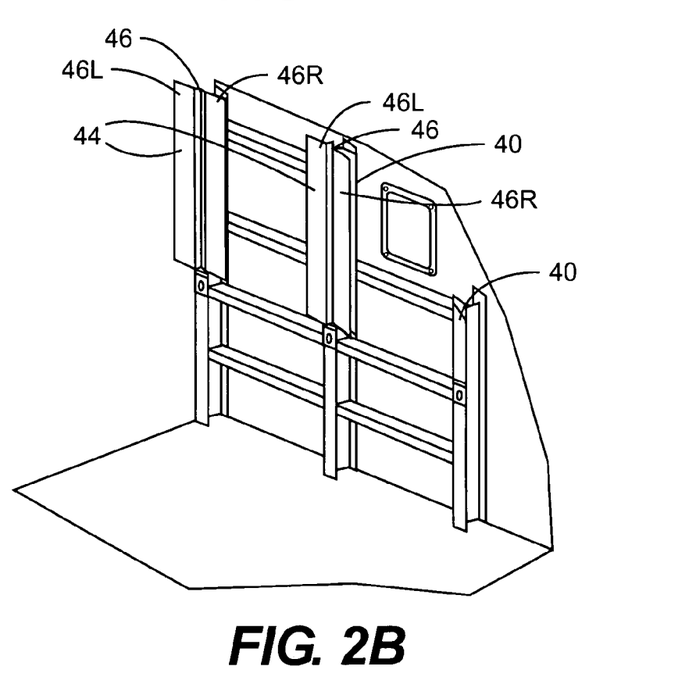
FIG. 2B is a perspective view of an airframe section of FIG. 2A with a blanket mounting strip attached to designated airframe member.
Figure 2C:
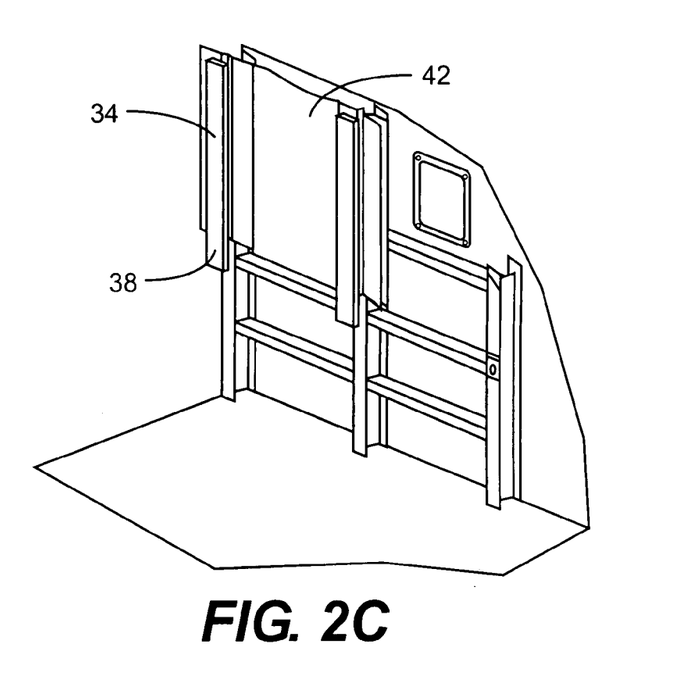
FIG. 2C is a perspective view of an airframe section of FIG. 2B with a soundproofing blanket mounted to the blanket mounting strips and internal skeleton members attached to designated airframe member.

The multitude of frame members 26 includes a multitude of interior skeleton mounts 32 which support an interior skeleton structure 34 (FIG. 2C). The interior skeleton mounts 32 preferably include posts 36 to receive corresponding receivers 38 located in the interior skeleton structure 34 such that the interior skeleton structure 34 essentially "snaps" in place. The interior skeleton structure 34 is preferably manufactured of composite materials.

The multitude of frame members 26 include hook and loop fastener strips 40 mounted to the frame members 26. It should be understood that "hook and loop" are described herein as a fastener system in which one strip of "hook" material is attached to one member and a "loop" material is attached to the other member to provide removable attachment therebetween. It need not matter which member has "hook" material and which has "loop" material attached thereto so long as the removable attachment is provided therebetween. The fastener strips 40 are bonded directly to the frame members 26 between the interior skeleton mounts 32. Preferably, the fastener strips 40 are arranged vertically relative to the aircraft cabin floor F in a parallel arrangement along each vertical frame member 26v to which a soundproofing blanket 42 (FIG. 2C) is to be installed.

Referring to FIG. 2B, a blanket mounting strip (BMS) 44 is attached to the fastener strip 40. The BMS 44 is attached to the fastener strip 40 through a hook and loop strip to provide removable attachment to the fastener strip 40. The BMS 44 is generally of a "><" shape to removably capture a soundproofing blanket 42 between the opposed pair of wings 46L, 46R thereof (also illustrated in FIG. 2C).

The blankets 42 typically include a sandwich structure including a lower foam layer, a vinyl mass barrier layer, and an upper foam layer. A vapor barrier made from a polyvinyl fluoride material sold by E. I. du Pont De Nemours and Company under the trade name TEDLAR surrounds the sandwich structure to prevent handling damage to the foam layers and prevent fluid absorption (water, oil, hydraulic fluid, etc.) by the foam layers. It should be understood that other blanket constructions will also be usable by the present invention. In fact, attachment of soundproofing materials other than structures commonly known as "blankets" will also benefit from the present invention.

Figure 2D:
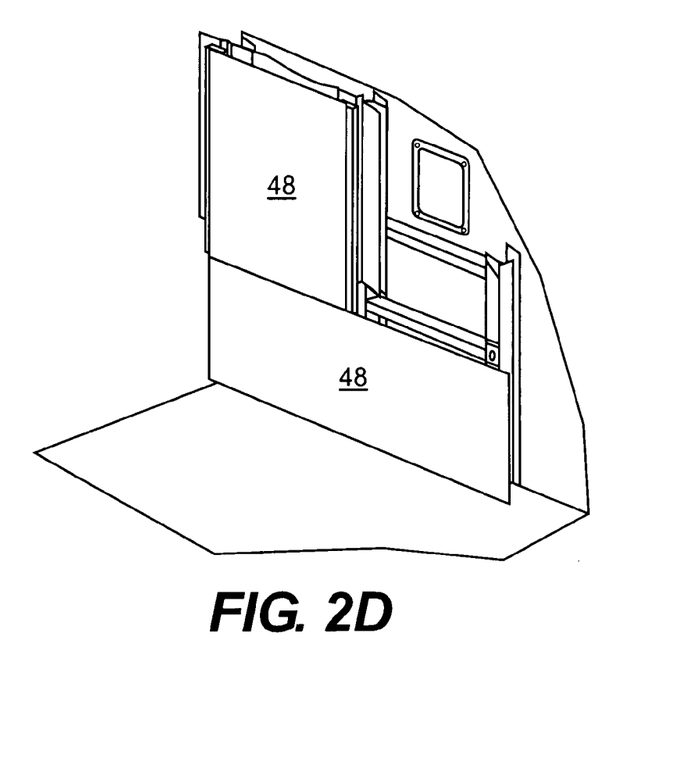
FIG. 2D is a perspective view of an airframe section of FIG. 2C with interior trim panels mounted to the internal skeleton members.

Referring to FIG. 2C, the interior skeleton structure 34 is mounted to the interior skeleton mounts 32 to generally overlap and provide for additional retention of the BMS 44 to the fastener strip 40. The interior skeleton structure 34 provides support and attachment for a multitude of acoustic absorption trim panels 48 (FIG. 2D) through fasteners such as quarter turn fasteners or the like.

Figure 3A:
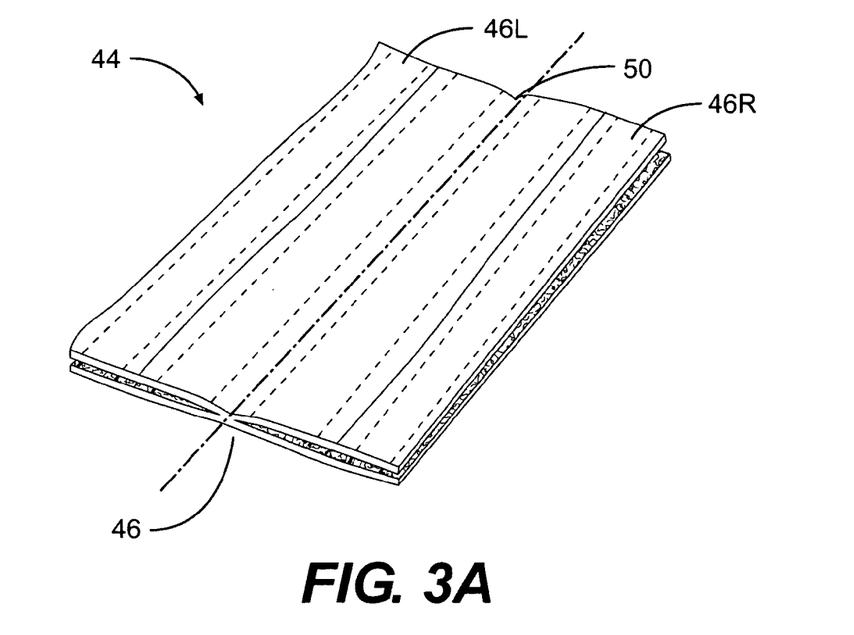
FIG. 3A is a perspective view of a blanket mounting strip according to the present invention.

Referring to FIG. 3A, the BMS 44 includes the opposed pairs of wings 46R, 46L which are attached along a central intersection 50 to form the "><" shape.

Figure 3B:
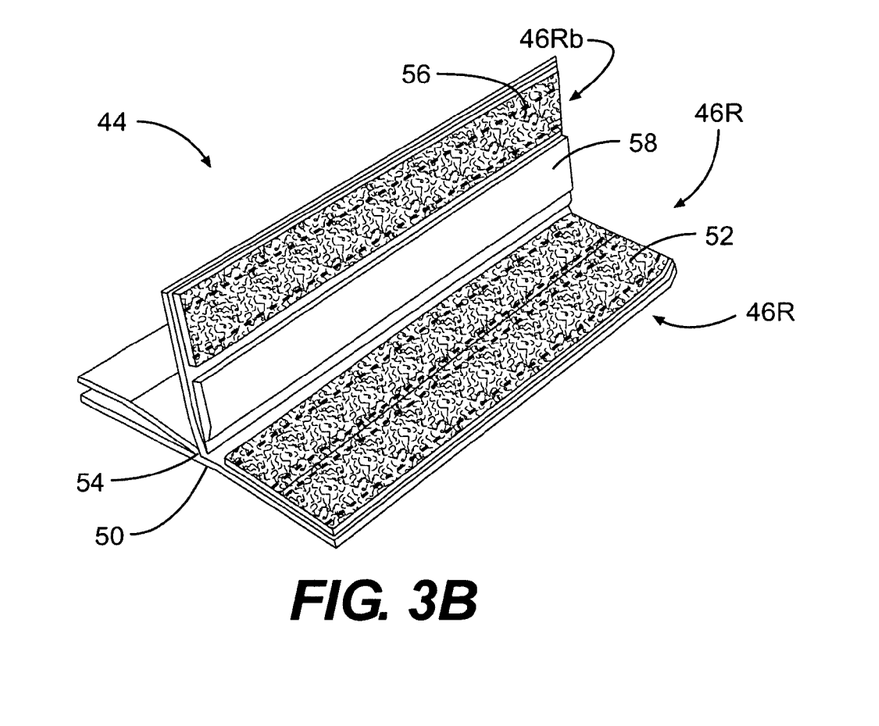
FIG. 3B is a perspective view of a blanket mounting strip with a pair of wings separated.

Referring to FIG. 3B, one pair of wings 46R will be described, however it should be understood that opposed pair of wings 46L are constructed in a similar manner. A first wing 46Ra of the pair of wings 46R includes a wing hook and loop strip 52 preferably sewed to a BMS base material layer 54. The base material layer 54 is generally of the "><" shape and manufactured of a material such as that of the soundproofing blanket 42. A second wing 46Rb opposed to the first wing 46Ra of the pair of wings 46R includes a wing hook and loop strip 56 and an acoustic gasket strip 58 preferably manufactured of a foam and sewn to the BMS base material layer 54. The hook and loop strip 56 and the acoustic gasket strip 58 are generally parallel with the acoustic gasket strip 58 located adjacent the central intersection 50.

Figure 3C:
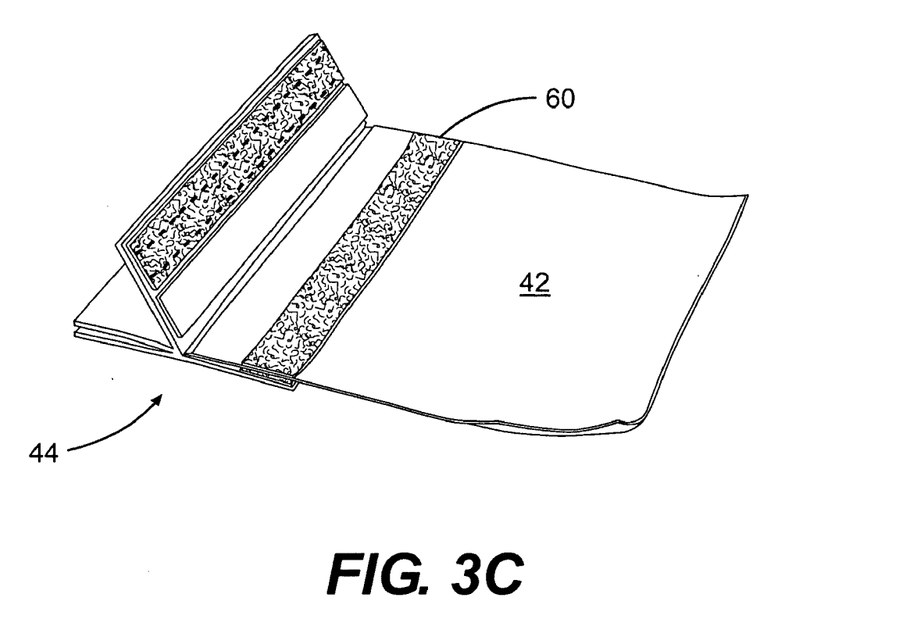
FIG. 3C is a perspective view of a blanket mounting strip with a blanket mounted to one of the pair of wings.
Figure 3D:
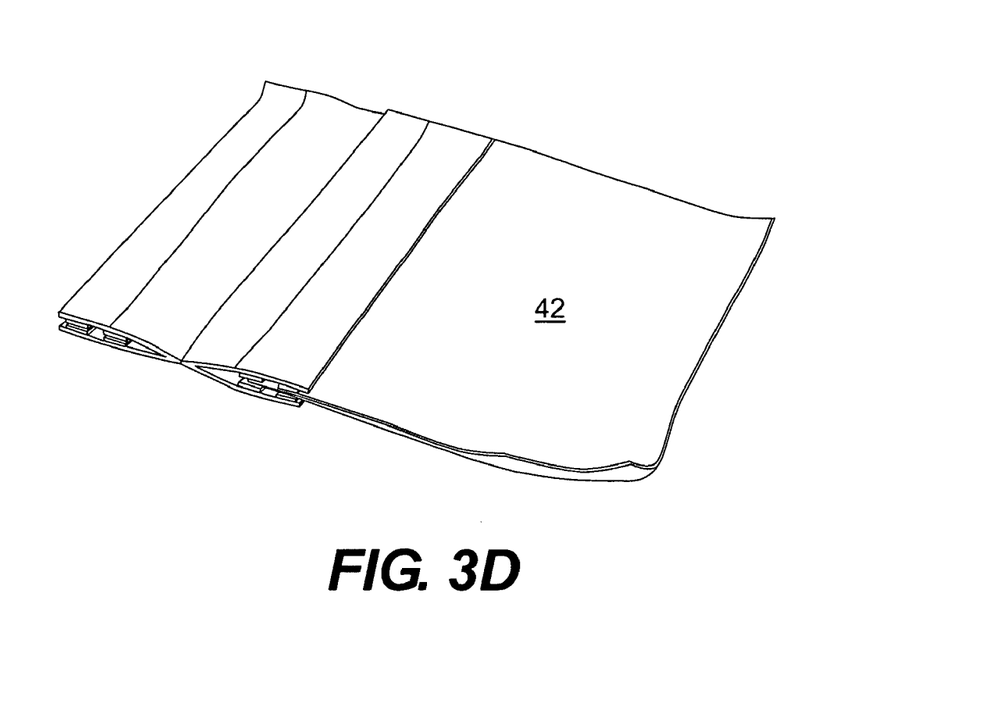
FIG. 3D is a perspective view of a blanket mounted between a pair of wings of a blanket mounting strip according to the present invention.

Referring to FIG. 3C, the blanket 42 includes opposed blanket hook and loop strips 60 (top one shown). The opposed blanket hook and loop strips 60 correspond to the wing hook and loop strips 52, 56 such that the blanket is retained between the wings 46Ra, 46Rb (FIG. 3D). The acoustic gasket strip 58 minimizes acoustic leakage heretofore experienced in soundproofing blanket attachments.

Figure 4:
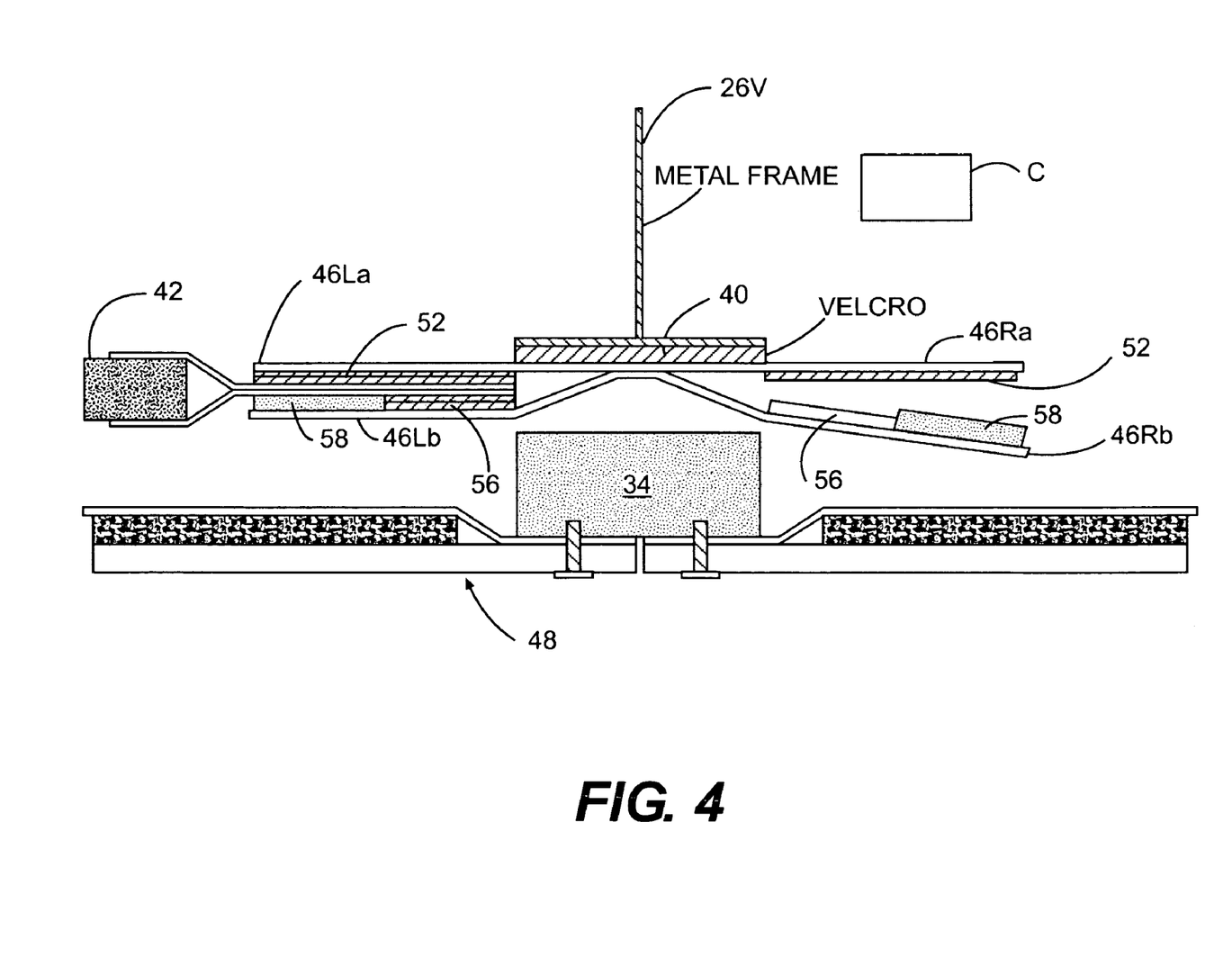
FIG. 4 is a sectional view of an acoustic absorption blanket mounting system according to the present invention taken along the line 4-4 in FIG. 3D.

Referring to FIG. 4, an acoustic absorption blanket mounting system 62 according to the present invention is illustrated in cross-section generally perpendicular to a vertical frame member 26v. Mounting the BMS 44 to the vertical frame member 26v relieved the stacking interference on the airframe and introduced the maintenance access. Furthermore, the present invention provides a crashworthy benefit by moving the mass load to the airframe rather than the interior support structure.

Figure 3E:
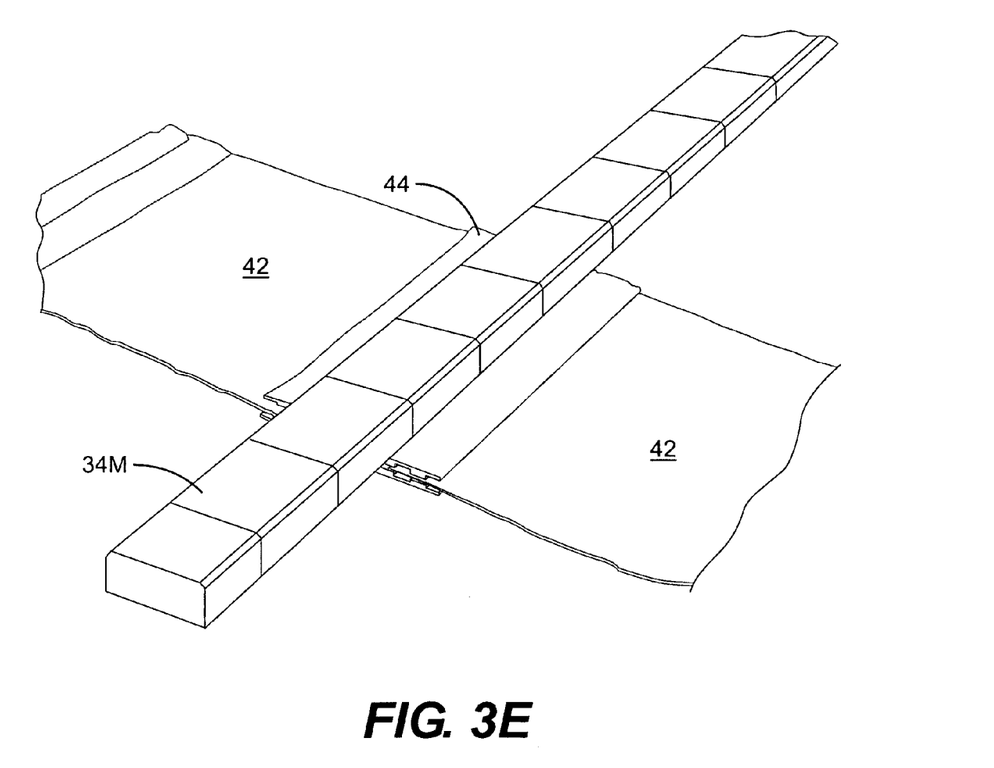
FIG. 3E is a perspective view of a blanket mounting strip mounted behind an internal skeleton structure.

With each pair of wing 46R, 46L of the BMS being located outside the edges of the adjacent interior skeleton structure member 34M (also illustrated in FIG. 3E), each opposed blanket 42 may be removed independently without the necessity of skeleton removal or disturbance of the acoustic integrity of the neighboring blanket. For example only, should it be necessary to remove the right side blanket 42R only the acoustic absorption trim panels 48R directly in front of the blanket 42R need be removed to access a component C located there behind. Unlike current soundproofing blanket attachments, the acoustic absorption blanket mounting system 62 according to the present invention does not require removal of the left acoustic absorption trim panel 48L, the interior skeleton structural member 34M, or the adjacent soundproofing blanket 42L which is also mounted to the interior skeleton structural member 34M.

Figure 5:
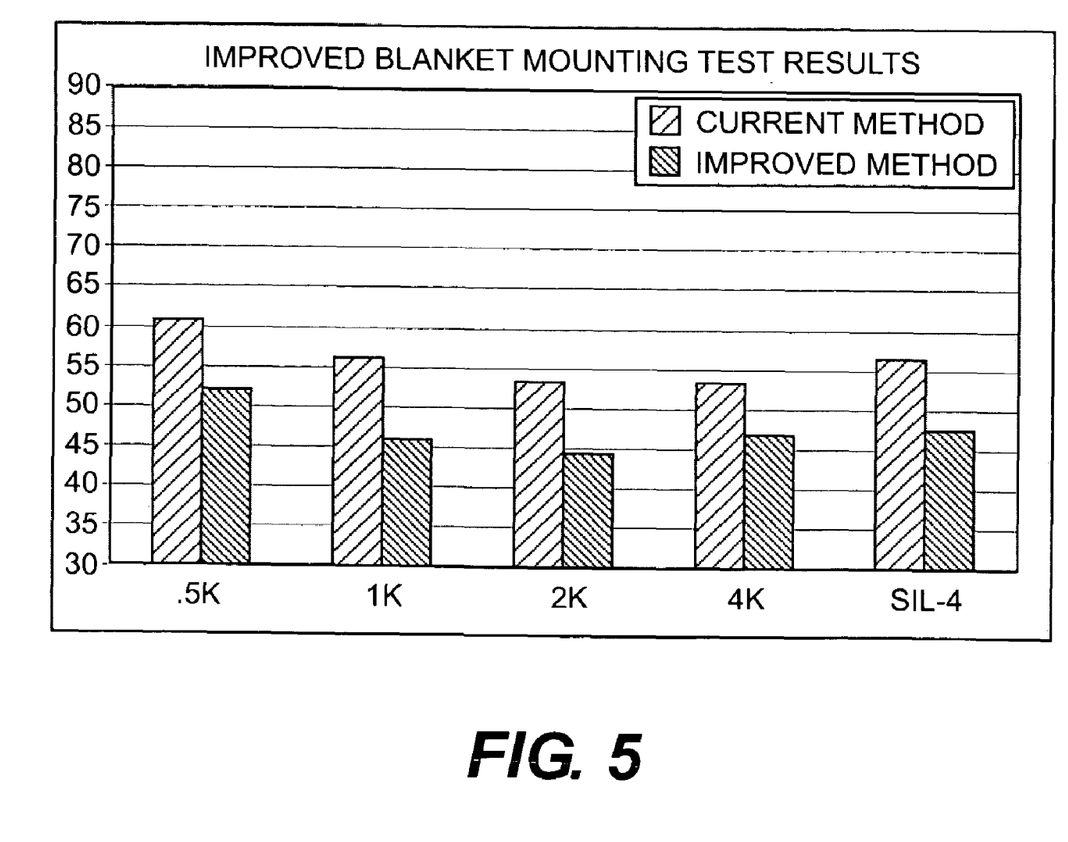
FIG. 5 is graphical comparison of the acoustic absorption blanket mounting system according to the present invention with a conventional blanket attachment.

Referring to FIG. 5, the acoustic absorption blanket mounting system 62 according to the present invention depicts the results of the acoustic testing whereby a reduction of at least 8.4 dB SIL-4 was accomplished.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A soundproofing blanket mounting strip in an airframe comprising:
    a base layer which includes a first wing and a second wing;
    a first wing fastener strip attached to said first wing;
    a second wing fastener strip and an acoustic gasket attached to said second wing.

2. The soundproofing blanket mounting strip as recited in claim 1, further comprising a third wing adjacent a fourth wing, said first wing and said second wing adjacent to said third wing and said fourth wing.

3. The soundproofing blanket mounting strip as recited in claim 2, wherein said first wing, said second wing, said third wing and said fourth wing define a generally ✕ shape.

4. The soundproofing blanket mounting strip as recited in claim 2, wherein said first wing, said second wing, said third wing and said fourth wing meet at a central intersection.

5. The soundproofing blanket mounting strip as recited in claim 4, further comprising a fastener strip mounted along said central intersection.

6. The soundproofing blanket mounting strip as recited in claim 1, wherein said first wing fastener strip and said second wing fastener strip include a hook and loop fastener.

7. An acoustic absorption blanket mounting system comprising:
    a base layer which includes a first wing and a second wing, said first wing opposed from said second wing;
    a first wing fastener strip attached to said first wing;
    a second wing fastener strip and an acoustic gasket attached to said second wing; and
    a soundproofing blanket having a blanket fastener strip engageable with said first fastener strip, said soundproofing blanket engageable with said acoustic gasket.

8. The acoustic absorption blanket mounting system as recited in claim 7, further comprising a third wing and a fourth wing, said third wing opposed from said fourth wing and said first wing and said second wing, opposed to said third wing and said fourth wing such that said first wing, said second wing, said third wing and said fourth wing meet at a central intersection.

9. The acoustic absorption blanket mounting system as recited in claim 8, further comprising a fastener strip mounted along said central intersection.

10. The acoustic absorption blanket mounting system as recited in claim 9, further comprising an interior skeleton structure member adjacent said central intersection.

11. The acoustic absorption blanket mounting system as recited in claim 7, wherein said blanket fastener strip is an opposed blanket fastener strip engageable with said first fastener strip and said second fastener strip.

12. An acoustic absorption blanket mounting system for attachment to an airframe frame member comprising:
    a frame fastener strip mounted to an airframe frame member
    a base layer which includes a first wing and a second wing attached at an intersection, said first wing opposed from said second wing;
    a central fastener strip mounted to said central intersection to mount said base layer to said frame fastener strip;
    a first wing fastener strip attached to said first wing;
    a second wing fastener strip and an acoustic gasket attached to said second wing; and
    a soundproofing blanket having a blanket fastener strip engageable with said first fastener strip, said soundproofing blanket engageable with said acoustic gasket.

13. The acoustic absorption blanket mounting system as recited in claim 12, further comprising:
    an interior skeleton mount attached to said airframe frame member;
    an interior skeleton member mountable to said interior skeleton mount, said interior skeleton member mountable at least partially over said base layer.

14. The acoustic absorption blanket mounting system as recited in claim 13, further comprising:
    an interior trim panel attachable to said interior skeleton member.

15. The soundproofing blanket mounting strip as recited in claim 1, wherein said second wing fastener strip is adjacent said acoustic gasket.

16. The soundproofing blanket mounting strip as recited in claim 4, wherein said acoustic gasket is outboard said first wing fastener strip relative said central intersection.

17. The soundproofing blanket mounting strip as recited in claim 4, wherein said acoustic gasket is inboard said first wing fastener strip relative said central intersection.

18. The acoustic absorption blanket mounting system as recited in claim 7, wherein said central intersection is defined by stitching.

19. The acoustic absorption blanket mounting system as recited in claim 7, wherein said acoustic gasket is manufactured from a foam material and is generally parallel to said second wing fastener strip.

20. The acoustic absorption blanket mounting system as recited in claim 14, wherein said interior trim panel is outboard said soundproofing blanket relative said airframe frame member.

* * * * *

UNITED STATES PATENT AND TRADEMARK OFFICE
CERTIFICATE OF CORRECTION

PATENT NO. : 7,429,015 B2
APPLICATION NO. : 11/017564
DATED : September 30, 2008
INVENTOR(S) : Drost

Page 1 of 1

It is certified that error appears in the above-identified patent and that said Letters Patent is hereby corrected as shown below:

Claim 4, Column 5, line 31: "soundproofIng" should read as --soundproofing--

Signed and Sealed this

Second Day of December, 2008

JON W. DUDAS
*Director of the United States Patent and Trademark Office*